United States Patent [19]
Jauch

[11] 3,914,853
[45] Oct. 28, 1975

[54] APPARATUS FOR TRANSPORTING WORKPIECES

[76] Inventor: Kurt Jauch, Schillerstrasse 1, 7445 Bempflingen, Germany

[22] Filed: Mar. 6, 1974

[21] Appl. No.: 448,626

[30] Foreign Application Priority Data
Mar. 6, 1973 Germany............................ 2310990

[52] U.S. Cl. ................................. 29/563; 29/33 P
[51] Int. Cl.² .......................................... B23Q 7/00
[58] Field of Search ............. 269/63, 64, 30; 82/2.5; 29/568, 563, 38 A, 38 B, 37 A, 37 R; 90/11 A

[56] References Cited
UNITED STATES PATENTS

| | | | |
|---|---|---|---|
| 2,711,817 | 6/1955 | Hautan et al. ........................ | 29/33 P |
| 3,443,310 | 5/1969 | Burroughs et al. .................... | 29/568 |
| 3,504,583 | 4/1970 | Hartman ................................ | 82/30 |
| 3,550,487 | 12/1970 | Randall et al. ......................... | 82/2.5 |
| 3,552,240 | 1/1971 | Wüsteney et al. .................. | 269/63 X |
| 3,571,873 | 3/1971 | Muller et al. ....................... | 29/564 X |
| 3,825,245 | 7/1974 | Osburn et al. ......................... | 269/30 |

*Primary Examiner*—Yost, Frank T.
*Assistant Examiner*—W. R. Briggs
*Attorney, Agent, or Firm*—Webb, Burden, Robinson & Webb

[57] ABSTRACT

This invention deals with an apparatus for transporting workpieces between the chucks of various machining stations and for centering the workpieces relative to the chucks, having at least one spider that is movable step-by-step about a trunnion and whose arms are longitudinally adjustable relative to the trunnion, each arm having at its free end a workpiece carrier that is rotatably mounted about its own axis of rotation.

8 Claims, 6 Drawing Figures

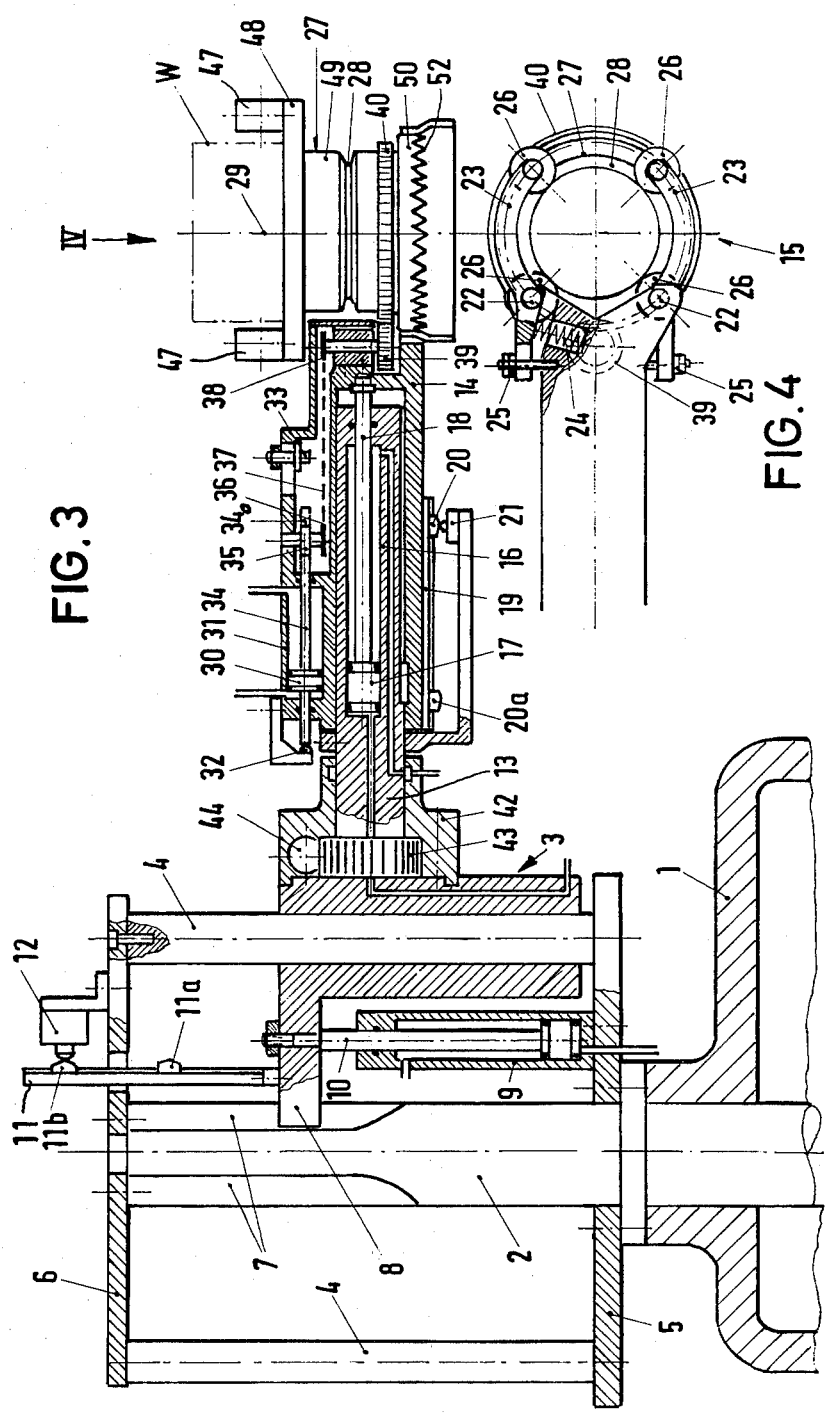

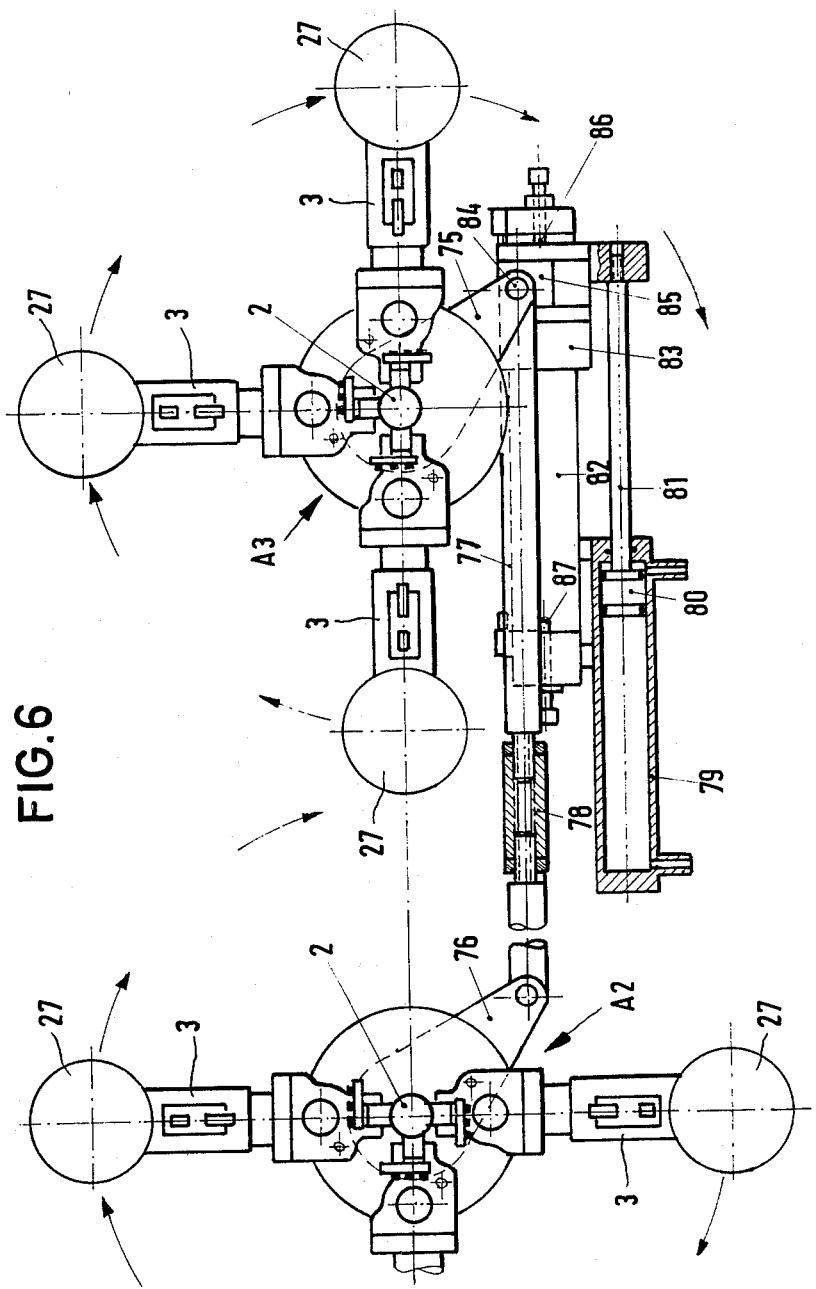

APPARATUS FOR TRANSPORTING WORKPIECES

In already known apparatuses of the type described, the workpiece carriers are fixedly connected to the arms of the progressively rotatable spider as components thereof; prior to the rotation of the spider each workpiece holder must pick up a workpiece at a work station and, as the spider rotates, carry it along to the machining station that is next in the working order and there it must set the workpiece down in such a way that it will be picked up by a chuck provided at the machining station, be centered and clamped in place. High requirements in the accuracy of centering and clamping each individual workpiece at each individual machining station while the chuck is operating automatically can be met only if from the outset each workpiece has at least one precisely machined centering surface such as a shoulder or bore which has previously been machined on a lathe which can be successively engaged by the chuck of the various machining stations.

There are many workpieces on which such favorable prerequisites for precisely centered clamping at the various machining stations cannot be provided, and even when this is possible, simple centering will frequently not suffice, instead it is necessary, at least at individual machining stations or during its transportation to such stations, to bring each workpiece into a certain angular position by turning it about a workpiece axis.

It is therefore an object of the invention to provide an apparatus of the type described in such a way that in addition to transporting the workpieces between the chucks of various machining stations, it will also be possible to provide particularly accurate automatic centering and indexing of any type of workpiece at each individual machining station. By indexing we mean clamping tight in predetermined angle of rotation.

The invention achieves this aim by releasably connecting the workpiece carrier to a gripping appliance disposed on each arm and by providing the workpiece carrier on a side that has not been engaged by the gripping appliance with a splined face (Hirth-type serrations) that is concentric with the axis of rotation of the workpiece carrier and by providing stationary complementary face-splines at each machining station and designing the associated chuck for axially clamping the face-splines to one another.

It has been found that with the arrangement of the invention extraordinarily accurate centering and indexing of the workpiece carrier is possible at the various machining stations which may be at quite some distance from one another and/or at different elevations, and that it is not particularly necessary to provide especially great precision in the manufacture of the individual machine elements involved in transporting the workpiece carrier. Thus, for example, it is not essential that the spider be journaled on its trunnion without play and that the step-by-step rotations of the spider be terminated in a particularly precisely defined angular position after each step. It is enough if at the end of each rotational step of the spider each of the workpiece carrier it is transporting assumes a position in which its face splines are approximately equiaxially opposite any complementary face splines of a machining station; any possible axial displacement will then be readily corrected when the opposing face splines are interlocked, since the face-splines automatically center themselves relative to one another.

In a preferred embodiment of the apparatus of the invention the rotational axis of each workpiece carrier connected to an arm extends at right angles to the longitudinal axis of the arm. If, for example, the rotational axis extends parallel to the trunnion of the spider, by moving the spider longitudinally along its trunnion the individual workpiece carriers can be set down at a machining station and after machining may again be lifted off the machining station. But it is also possible within the scope of the invention to so design the gripping appliances on the arms of the spider that the rotational axes of the carriers will be disposed in the longitudinal direction of their associated arms, namely, essentially radially to the trunnion of the spider and that the face splines of the workpiece carriers are directed radially outwardly relative to the trunnions of the spider.

For practical purposes each workpiece carrier has a peripheral groove concentric with its axis of rotation and each gripping appliance has two swingable forked levers in each of which two rollers are rotatably mounted at peripheral intervals for engagement in the peripheral groove.

In a further development of this arrangement the forked levers are biased toward one another by means of springs and are mounted on a radial slide carriage which is movably guided in the longitudinal direction of its associated arm so that by moving the radial slide carriage out, the rollers of the forked levers will be able to come to rest in the peripheral groove of a workpiece carriage that is clamped to a machining station.

In this connection it is also practical for the radial slide carriage of each arm to be rotatably adjustable about the longitudinal axis of the said arm. It is then possible to include in the cycle of workpiece carriers machining stations whose chucks are not disposed axially parallel to the trunnion of the spider. Above all, conventional machine tools, such as turner's lathes with a horizontal work spindle, may be provided as machining stations.

It is furthermore advantageous if each workpiece carrier has a ring gear concentric with its rotational axis, and if a pinion is mounted on the radial slide carriage of each arm, the said pinion meshing with the ring gear of the workpiece carrier held by the associated gripping appliance and being connected to a drive mechanism disposed on the radial slide carriage. In this way, it is possible to let the workpiece carriers disposed on the gripping appliances execute a relative rotation with respect to the associated arms during the transportation between two machining stations, for example, for the purpose of maintaining a given angular position of the workpiece carriers relative to a stationary system of coordinates during the rotation of the spider.

In the preferred embodiment of the invention the arms are individually movable along the trunnion of the associated spider. This makes it possible to arrange the machining stations at different elevations all around the preferably vertical trunnion, which also makes it easier to use conventional machine tools or devices available in a plant as the machining stations.

On each workpiece carrier a support ring may be disposed concentrically with the face-splines of the workpiece carrier, and each chuck may have a spreader bar which is movable along the axis of the face splines of the associated machining station and which at its one end has swingably mounted hook-shaped levers which may be brought into engagement with the support ring from within.

A further feature of the invention resides in the fact that radially within the face-splining of at least one machining station a hollow nozzle ring is disposed for squirting out a flushing agent to clean the face splines. This makes it possible to keep the face splines clean even in those machining stations where much dirt is caused, such as by metal chips.

The invention will be more fully explained below with the aid of schematic drawings of examples in which:

FIG. 3 is a substantially larger vertical section taken along line III—III of FIG. 1;

FIG. 4 is a partial plan view shown partially in section and taken in the direction of arrow IV in FIG. 3;

FIG. 6 is a cut out portion of the upper part of FIG. 2. shown partially in section in a horizontal plane and on an enlarged scale.

In the present invention the term "machining station" is intended to signify stations at which any type of work can be carried out on a workpiece, primarily cutting operations, but other operations such as non-cutting shaping work and measurements may also be included.

Figures 1, 2:
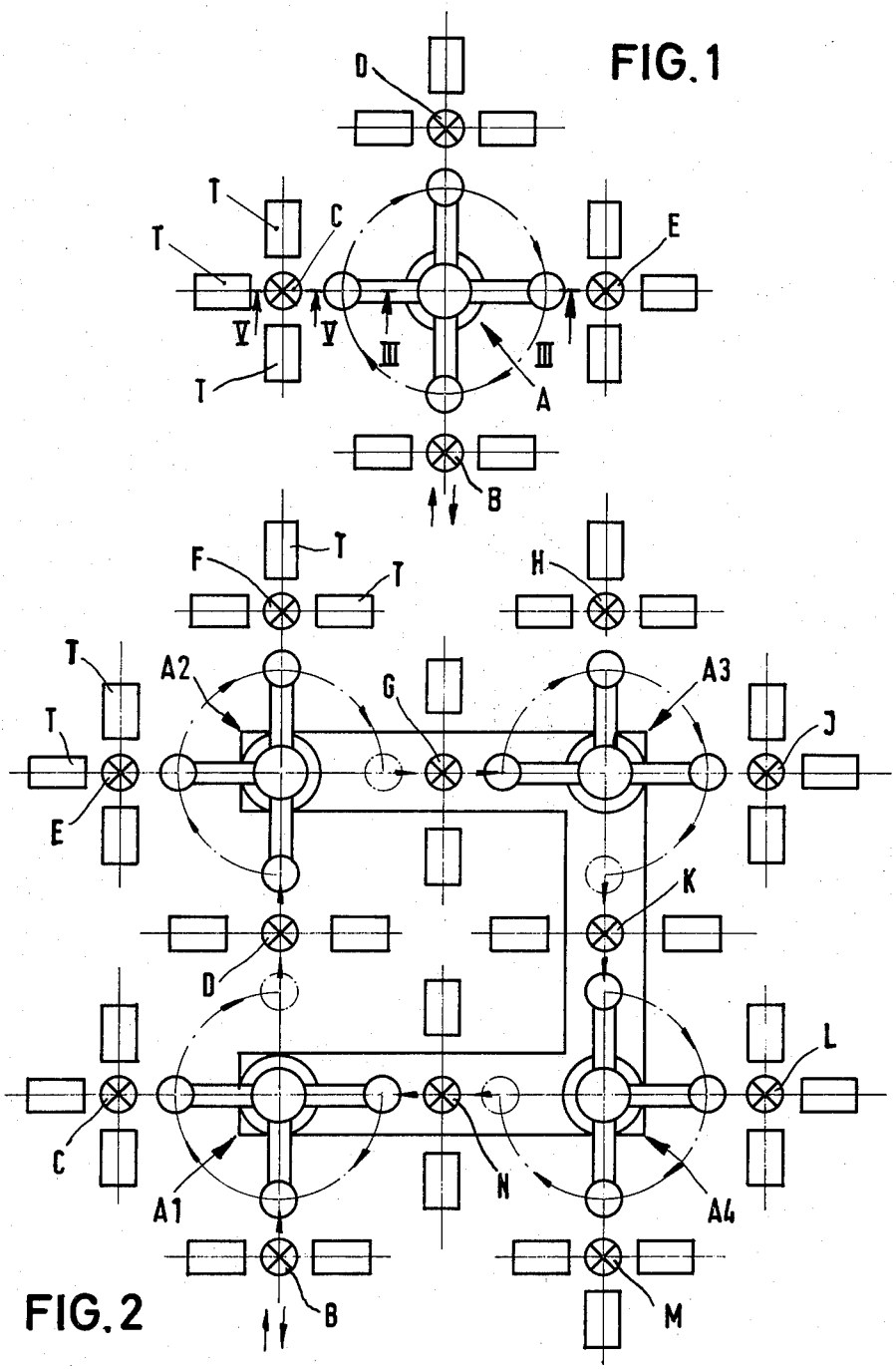
FIG. 1 is a plan view of an apparatus for transporting workpieces between four machining stations.
FIG. 2 is a plan view of an apparatus for transporting workpieces between twelve machining stations.
Figure 5:
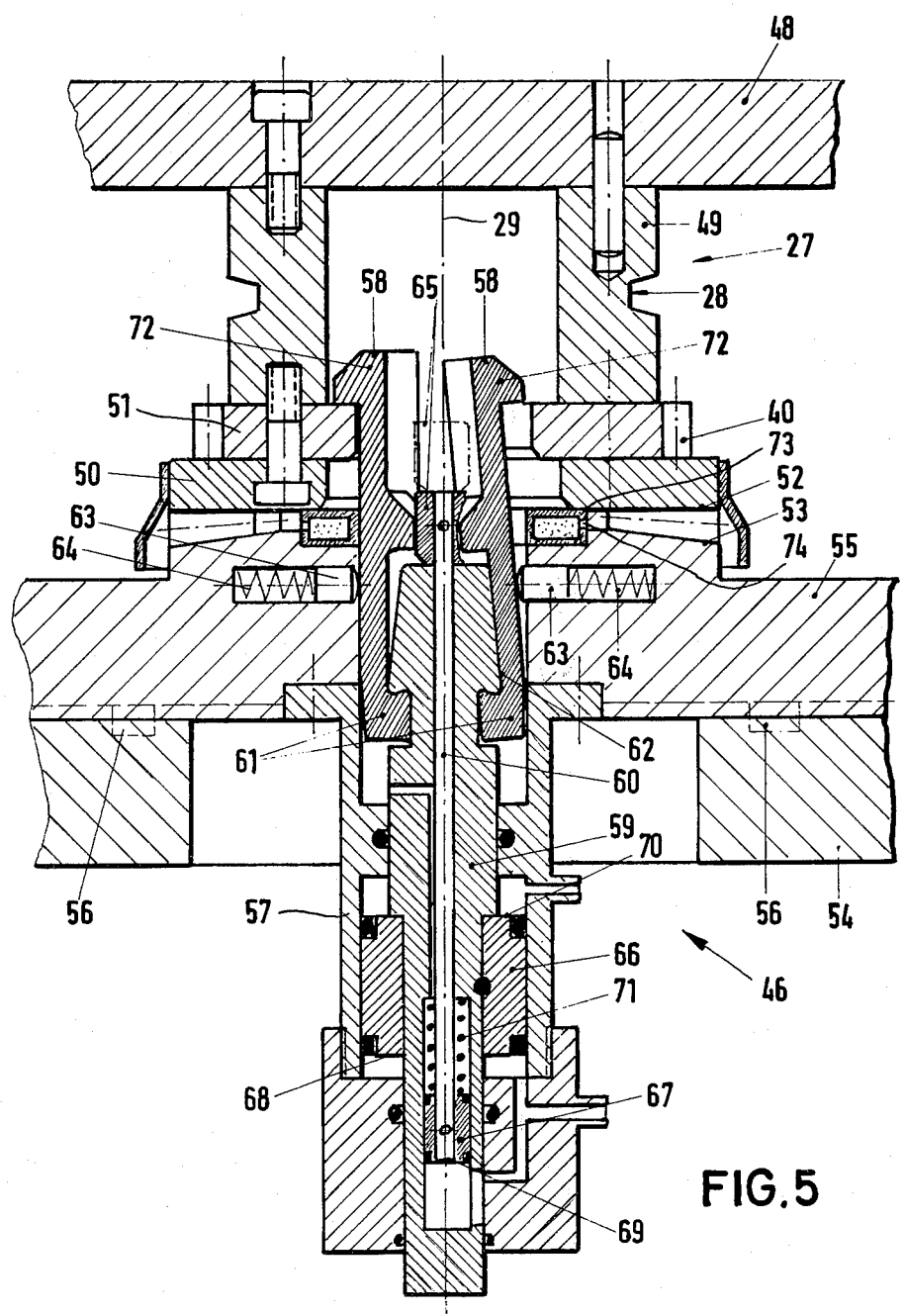
FIG. 5 is an even more enlarged section taken along line V—V of FIG. 1.

The apparatus shown in FIG. 1 and in greater detail in FIGS. 3 to 5 has a four armed spider A whose purpose it is to move workpieces which are brought from without to a machining station B, for instance by a worker, progressively from machining station B to additional machining stations C, D, and E and finally back to machining station B, where the machined workpieces are removed, for instance by the same worker, the said machining stations being disposed at equal angular distances about the trunnion of spider A. At machining station B two diametrically opposed machine tools or machining units T are disposed which act upon a workpiece in machining station B either consecutively or simultaneously. In corresponding manner three machine tools or machining units T are arranged around each of the machining stations C, D, and E. An additional machining unit (not shown) may be disposed vertically above each of the machining stations B, C, D, and E. The machining units are used, for example, to do lathe work, boring work, milling work and thread cutting work on the workpieces which are transported one after the other to all the stations. The transporting carried out by a spider A may be done in such a way that the spider always rotates progressively by 90° and always in the same direction; but the same result may be achieved if a spider A rotates back and forth by only 90°.

The apparatus shown in FIG. 2 has four three-armed spiders A1, A2, A3 and A4, each of which can rotate out of its position as shown In FIG. 2 by only 90° in a clockwise direction and then rotate back again by 90°. Spider A1 to A4 are so designed and arranged that spider A1 progressively conveys the workpieces from a first machining station B to additional machining stations C and D, as is likewise the case with spider A of FIG. 1. In contrast to FIG. 1, however, in FIG. 2 each workpiece that has reached machining station D and has been machined there is moved along by spider A2 to a machining station E and from there to additional machining stations F and G. Each workpiece that has reached machining station G and has been machined there is taken over by spider A3 and is conveyed progressively to additional machining stations H, J and K. And finally, every workpiece that has reached machining station K and has been machined there is moved along progressively by spider A4 to machining stations L, M and N in order to be finish machined in machining station N and to be brought back from there by spider A1 to machining station B.

FIGS. 3 and 4 show details which are common to all the spiders shown in FIGS. 1 and 2.

Each spider possesses a pedestal 1 in which a vertical trunnion 2 is rotatably mounted. Entirely or partly within pedestal 1 a drive means (not shown) may be disposed which imparts to the spider in question the above rotational movements which takes place step-by-step. But it is also possible to provide a common drive means for two or more spiders; and example of this will be more fully explained with the aid of FIG. 6.

Trunnion 2 of each spider protrudes upwardly out of pedestal 1 and carries two or more arms 3, depending upon the task which the spider in question is to carry out within the whole apparatus. The arrangement shown in FIG. 1 with four arms 3 disposed at angular distances of 90°, as well as the arrangements shown in FIG. 2 with three arms 3 disposed at angular distances of 90° and with an intervening space of 180° are merely examples, for other applications spiders with three, five or six arms 3 disposed at equal angular intervals of 120° or 72° or 60° may prove to be more practical.

Each arm 3 is movable on a guide post 4 which is parallel to trunnion 2 and together with one or more additional guide posts for the one or more arms 3 is rigidly connected to trunnions 2 by means of disks 5 and 6. Each arm 3 extends basically radially from a guide vane 7 of trunnion 2 and at its radially inner end has a forked-shaped projection 8 which embraces its associated guide vane 7 and is guided along the latter basically without play, so that arm 3 cannot turn about its associated guide post 4.

Each arm 3 is movable upwardly and downwardly along its guide post 4 independently of all the other arms; for this purpose each arm is provided with a hydraulic cylinder 9 secured to disk 5, the piston rod 10 of the cylinder being secured to projection 8. Furthermore, a straightedge 11 that is parallel to guide post 4 and piston rod 10 is secured to projection 8 of each arm 3, upper and lower tripping cams 11a and 11b, whose elevation is adjustable, being mounted on straightedge 11. A switch associated with cams 11a and 11b is secured to disk 6 and may be designed as a series limit switch and may cooperate with additional tripping cams (not shown) disposed on the same straightedge 11 in order to limit the upward and downward movements of the associated arm 3 along post 4, various elevational limitations being providable in various angle of rotation positions of arms 3.

Each arm 3 has a radial guide 13 that is, a slide guide which extends radially relative to trunnion 2 and in the illustrated embodiments is horizontally disposed relative to vertical trunnion 2. A radial slide carriage 14 is movable guided on the radial slide guide 13 of each arm 3. In the illustrated embodiment radial slide carriage 14 is basically in the shape of a cylindrical sleeve, and the radial slide guide 13 is itself cylindrical; in this case any rotation of radial slide carriage 14 relative to radial slide guide 13 is prevented by means of a spline or the like. A gripping appliance 15 is disposed at the free end of each radial slide carriage 14. In order to move radial slide carriage 14 with gripping appliance 15 along radial slide guide 13 a piston drive is built thereinto which is composed of an axial cylindrical bore 16 in radial guide 13, a piston 17 movable therein, and a piston rod 18 secured to radial slide carriage 14.

The horizontal sliding paths of radial slide carriage 14 are limited for each angular position of arm 3, approximately in the same manner as are the vertical sliding paths of arms 3. For this purpose, a horizontal straightedge 19 is secured to radial slide carriage 14 with cams or pairs of cams 20 and 20a adjustably mounted thereon. These cams cooperate with a switch 21 which may be designed as a series limit switch and is fixedly connected to radial guide slide 13.

Secured to the end of its associated radial slide carriage 14 each gripping appliance 15 has two pins 22 both of which extend at right angles to the sliding direction of radial slide carriage 14. Mounted on pins 22 is a pair of levers 23, 23 each of which is pretensioned by a spring 24 urging the clamping device toward the closed position and which abuts against a stop 25 as the result of the said pretension. In the illustrated embodiment each stop 25 is formed by a threaded bolt which is threaded into radial slide carriage 14 and extends through an extension of the associated lever 23 and carries two lock nuts. On each lever 23 two rollers 26 are mounted parallel to one another, one of which is equiaxial with the associated pin 22.

Associated with the gripping appliances are workpiece carriers 27 each of which carries a workpiece W. The said workpiece carriers pass through all of the machining stations with the said workpiece, are then separated from the machined workpiece and take on a new workpiece in order to repeat the cycle as shown, for example, as in FIGS. 1, and 2. Every workpiece carrier 27 has a peripheral groove 28 in which rollers 26 may engage in such a way (FIG. 4) under the urging of springs 24 that workpiece carrier 27 on clamping device 15 will be connected to the radial slide carriage 14 in question in rotatable manner about its own rotational axis 29, but non-slidably along the said rotational axis 29.

In order to rotate workpiece carrier 27 about its rotational axis 29 a hydraulic piston drive is provided whose piston 30 may be moved back and forth for a distance defined by adjustable stops 32 and 33 within a cylinder formed on radial slide carriage 14. The two stops 32 and 33 work together with a piston rod 34 extending axially away from piston 30 toward both sides, piston rod 34 having a toothed rack 34a which meshes with a pinion 35 mounted on radial slide carriage 14. A chain sprocket 36 which is rotatably connected to pinion 35 is connected by way of a chain 37 to a chain sprocket 38 mounted centrally at the free end of radial slide carriage 14 and is, in turn, rotatably connected to a gear pinion 39. When a workpiece carrier 27 is held in the gripping appliance 15 as shown in FIGS. 3 and 4, gear pinion 39 will mesh with a gear ring 40 provided on workpiece carrier 27.

Radially slide guide 13 together with radial slide carriage 14 of gripping appliance 15 and a workpiece carrier possibly held therein may be pivoted about the longitudinal axis of radial slide guide 13 which extends at right angles to trunnion 2. For this purpose radial slide guide 13 is rotatably mounted in a bearing housing 42 of arm 3 and is firmly connected with a pinion 43 which prevents axial displacement of radial slide guide 13 and is in engagement within bearing housing 42 with a rack 44 which may be moved by a drive means (not shown), for instance, by a hydraulic piston drive whose cylinder is secured to bearing housing 42.

In FIG. 5 one of the machining stations B to N with a workpiece carrier 27 that has been set down there is shown in a section containing the longitudinal axis 29 of workpiece carrier 27. The machining station has a chuck 46 for clamping workpiece carrier 27 and the workpiece carrier has jaws 47 (See FIG. 3) for clamping workpiece W. Thus, the workpiece W can be clamped to each machining station by way of the workpiece carrier 27 and chuck 46 at each station.

The jaws 47 of each workpiece carrier 27 are adjustably guided in conventional manner on a workpiece receiving plate 48. Other components of the workpiece carrier 27 are a hollow cylindrical spacer 49, a base disk 50 and a support ring 51 disposed between base disk 50 and spacer 49; all these structural components are firmly secured to one another by means of pins and screws. Peripheral groove 28 is formed on spacer 49. Gear ring 40 is formed on support ring 51. On the underside of base disk 50 a face splining (Hirth-type serrations) 52 is formed concentrically with longitudinal axis 29. Hirth-type serrations are described, for example in the German text, Hutte, *Handbook of The Engineer, Part A, 28th Edition*, page 115.

In the position of workpiece carrier 27 as shown in FIG. 5, its face-splines 52 are in engagement with complementary face-splines which are formed on the upper side of a fixing plate 55 disposed on a machine bed 54. Fixing plate 55 is securely bolted down to machine bed 54; when the bolts are released, fixing plate 55 may be moved along guides 56 on machine bed 54 so that a predetermined distance may be set precisely between the axis of face-splines 53 and other parts, such as trunnion 2. As the result of the cooperation of face-splines 52 and 53 every workpiece carrier 27 may be fixed in a definite position with great accuracy and precise coordination may be established between workpiece W which is secured to workpiece carrier 27 and the machining units T disposed about the machining station in question. The chuck 46, provided at each machining station has a cylinder block 57 which is secured to fixing plate 55 and is connected to a recess in fixing plate 55 concentrically with face splines 53 and extends downwardly. In cylinder block 57 there are several, for example, three hooked levers 58 which are in the shape of a circular ring sector and are disposed about a hollow tie rod 59. An operating rod 60 is guided axially slidably in tie rod 59. In its upper portion tie rod 59 has an external annular groove in which inwardly extending projections 61 of hooked levers 58 engage. The portion of tie rod 59 above projections 61 is developed as a head 62 which tapers conically upward thus permitting each hooked lever 58 a tilting motion between a radially outer position shown to the left of center in FIG. 5, and a radially inner position shown to the right of center in FIG. 5.

Pins 63 are inserted into radial bores of fixing plate 55 and each pin is pretensioned by a spring 64 against a hooked lever 58; thus pins 53 strive to hold hooked levers 58 in the radially inner position in which they release ring 51 of workpiece carrier 27, so that the workpiece carrier may be lifted off.

In order for workpice carrier 27 to be clamped down it is necessary to swing hooked levers 58 into their radially outer position; for this purpose at the upper end of operating rod 60 an expanding cone 65 is secured which can be drawn by means of operating rod 60 from an idle position indicated in dot and dash lines in FIG. 5 into an operating position shown in solid lines in which is spreads the hooked levers 58 apart.

In order to exert downwardly directed clamping force on support ring 51 a piston 66 operates in cylinder block 57 is secured to tie rod 59. Similarly, at the lower end of operating rod 60 a piston 67 is secured which operated in a cylinder bore of tie rod 59. The lower faces 68 and 69 of pistons 66 and 67 may be acted upon jointly by a hydraulic pressure means, on the one hand, pushes tie rod 59, together with hooked levers 58, upwardly relative to the fixing plate, and on the other hand, pushes operating rod 60 together with expansion cone 65, upwardly relative to the tie rod and thereby causes expansion cone 65 to become inoperative.

The downwardly directed force that is required for spreading hooked levers 58 is generated by a spring 71 which presses against piston 67 and which becomes operative when the lower face 69 of piston 67 is relieved of hydraulic pressure. When hooked levers 58 are swung into their outer position in this manner, noses 72 formed on the levers will overlap the inner edge of support ring 51. When the hydraulic pressure acts upon the upper face 70 of piston 66, by way of hooked levers 58 tie rod 59 will pull support ring 51, and with it the entire workpiece carrier 27, firmly downwardly so that face-splines 52 and 53 will be pressed against one another while accurately centering themselves relative to one another and becoming nonrotatably connected to one another.

A nozzle ring 73 is disposed on fixing plate 55 radially within face-splines 53 for the purpose of cleaning face-splines 52 and 53. The nozzle ring is connected to a supply line (not shown) through which a pressurized flushing liquid may be introduced from time to time which emerges through nozzle 74 on the outer side of nozzle ring 73 and flows outwardly along the flanks of face-splines 53. If flushing is carried out in this manner while a workpiece carrier 27 is being set down, then the face splines 52 of workpiece carrier 27 will be cleaned at the same time.

The common drive for spiders A2 and A3 shown in FIG. 6, is a parallel crank drive. A crank 75 or 76 is secured to trunnion 2 of each spider A2 and A3; the two cranks 75 and 76 are connected to another by means of a coupling rod 77 whose length may be adjusted by means of a turnbuckle 78. A hydraulic cylinder 79 is fixedly mounted parallel to coupling rod 77 and its piston 80 is connected by way of a piston rod 81 to a slide carriage 83 which is slidable on a slide bar 82 parallel to coupling rod 77. On slide carriage 83 a hinge pin 84, connecting crank 75 to coupling rod 77 is slidably guided at right angles to the sliding direction of slide carriage 83; for this purpose hinge pin 84 is mounted on a sliding block 85. The sliding travel of slide carriage 83 is limited by adjustable stops 86 and 87 provided at the ends of slide bar 82; in this way the back and forth rotational movement of spiders A1 and A2 are adjustably limited also.

Just as in FIGS. 1 to 3, the arms 3 of the spiders in FIG. 6 are so short that the workpiece carriers 27 transported by them may move along the circular arc shown in FIG. 1, 2 and 6 without colliding with machining units T. So that the workpiece carriers 27 can reach machining stations B to E (FIG. 1) or B to N (FIG. 2), the arms are elongated while the spider is standing still, by moving radial slide carriages 14 on radial slide guides 13 into their outermost position in which the longitudinal axis 29 of each workpiece carrier 27 is aligned with the axis of the machining station in question. Thereupon the workpiece carriers 27 are deposited on the machining stations by moving arms 3 downwardly along their guide posts 4.

Having thus described the invention with detail and particularity as required by the Patent Laws, what is desired protected by Letters Patent is set forth in the following claims.

I claim:

1. An apparatus for transporting workpiece carriers and workpieces carried thereby between chucks of various machining stations, comprising a plurality of workpiece carriers having face-splining on one face and means for clamping the workpiece on an opposite face, and further having a peripheral groove coaxial with said face-splining.

a plurality of chucks having complementary face-splining and means for axially clamping together the face-splinings of the chucks and any one of said workpiece carriers, at least one spider being step-by-step rotatable about a trunnion each spider having a plurality of telescopic radial arms comprising a fixed guide extending radially with respect to said trunnion and a means slidably secured to said guide to move in the radial direction relative thereto, each arm having a gripping appliance at its free end comprising a pair of swingable levers spring-biased toward one another and adapted to engage said peripheral groove of any one said workpiece carriers, said levers when engaged in said peripheral groove permitting rotation of the workpiece carrier.

2. The apparatus as set forth in claim 1 in which each of said swingable levers has two rollers rotatably journaled thereon for engaging in said peripheral groove.

3. The apparatus as set forth in claim 2 in which one of said rollers on each of said levers is journaled on a pin pivotally supporting the respective lever, said pin being fixed to the outer end of the respective arm.

4. The apparatus as set forth in claim 1 in which each of said telescopic arms has a pinion rotatably mounted near the outer end of said arm, said pinion being connected to a drive mechanism disposed on the arm.

each of said workpiece carriers having a gear ring fixedly arranged thereon which is concentric with the face-splining and the peripheral groove of said workpiece carrier, said pinion meshing with said gear ring when the levers of said arm are engaged in the peripheral groove of the workpiece carrier.

5. The apparatus as claimed in claim 1 in which said spider comprises a bearing housing for each arm, said guide means of said arm being mounted in said bearing housing so as to be rotatable about is longitudinal axis and said guide means being fixedly connected to a pinion in the bearing housing, said pinion meshing with means for causing said pinion and said guide means to rotate.

6. The apparatus as set forth in claim 5 in which said bearing housing of each arm is guided on a guide post extending parallel to said trunnion with means for moving said bearing along said guide post.

7. The apparatus as set forth in claim 1 in which each workpiece carrier has a support ring concentrically disposed with the face-splines of the workpiece carrier and each chuck has a tie rod slidable along the axis of the face-splines of the chuck, said tie rod having at its one end swingably disposed hooked levers which may be brought into engagement with the support ring from within to hold the face-splines together.

8. The apparatus as set forth in claim 1 comprising radially within the face-splines of at least one of said chucks a hollow nozzle ring disposed with outwardly directed nozzles for dispensing a flushing agent which cleans the face-splines.

* * * * *